(No Model.)     J. WAGNER & H. DRYER.     2 Sheets—Sheet 1.
CORN HARVESTER.
No. 295,602.     Patented Mar. 25, 1884.
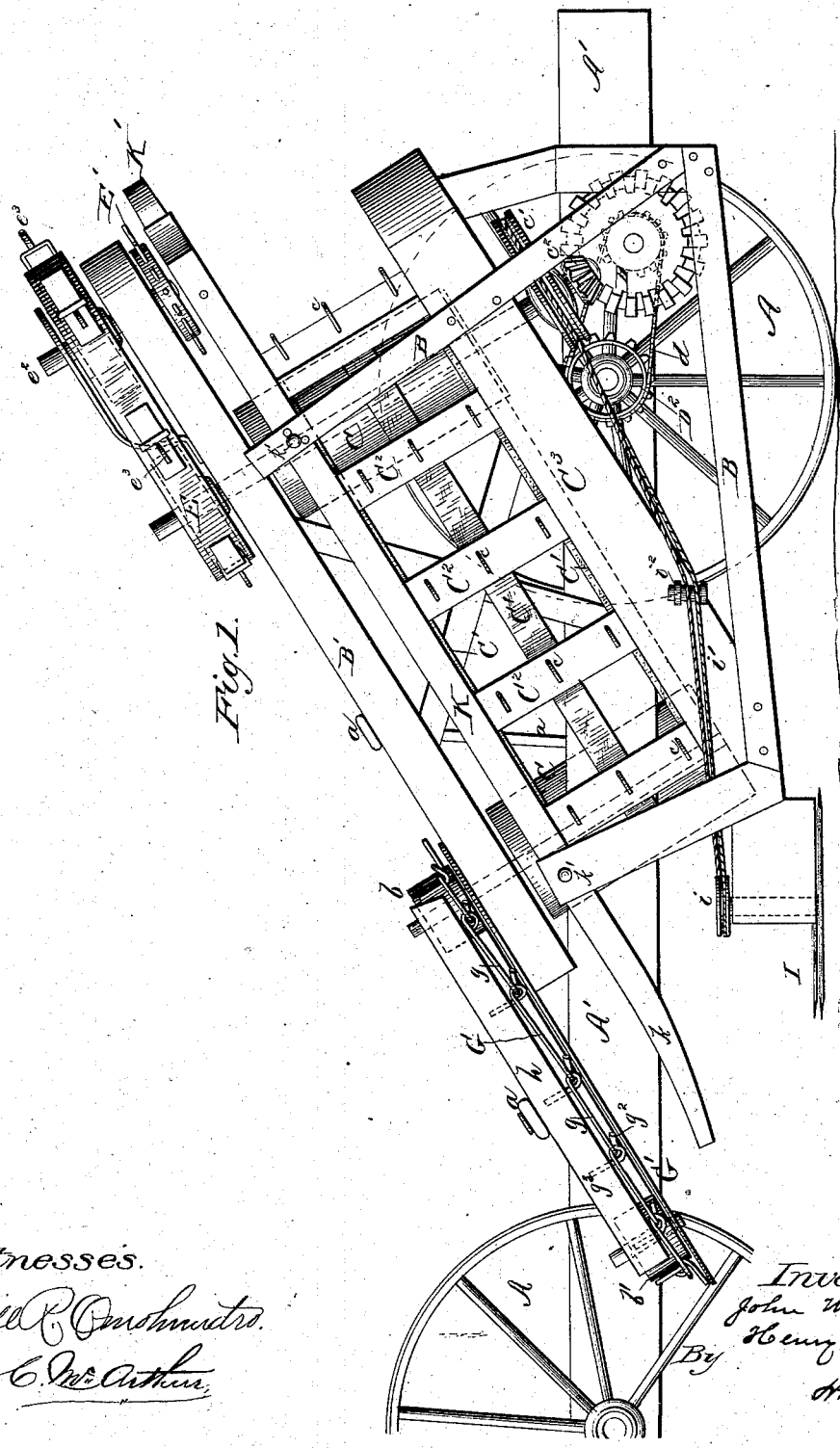

(No Model.) 2 Sheets—Sheet 2.
J. WAGNER & H. DRYER.
CORN HARVESTER.
No. 295,602. Patented Mar. 25, 1884.
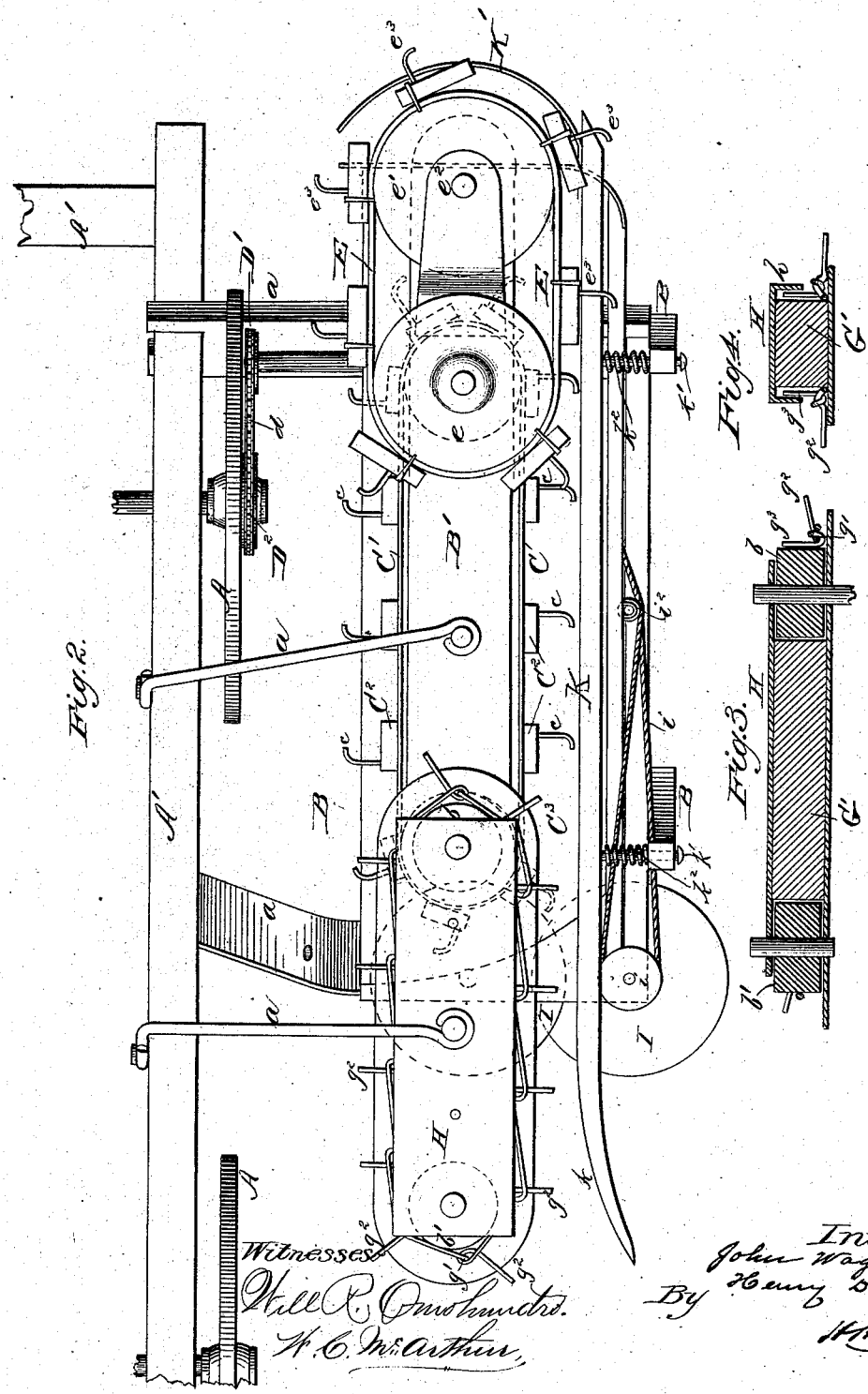

UNITED STATES PATENT OFFICE.

JOHN WAGNER AND HENRY DRYER, OF PORTAGE, WISCONSIN; SAID DRYER ASSIGNOR TO SAID WAGNER.

CORN-HARVESTER.

SPECIFICATION forming part of Letters Patent No. 295,602, dated March 25, 1884.

Application filed February 17, 1883. (No model.)

*To all whom it may concern:*

Be it known that we, JOHN WAGNER and HENRY DRYER, citizens of the United States of America, residing at Portage, in the county of Columbia and State of Wisconsin, have invented a new and useful Improvement in Corn-Harvesters, of which the following is a specification, to wit:

Our invention relates to corn-harvesters; and it consists in the peculiar construction and arrangement, adapted to be attached to and operated by a farm-wagon, whereby the stalks of corn are cut and carried in an upright position to the rear of the wagon, where they are delivered for binding by an attendant, substantially as will be hereinafter more fully described, and set forth in the claims.

In order to enable others skilled in the art to which our invention relates to avail themselves of its benefits, we will now proceed to describe its construction and operation, referring to the accompanying drawings, in which—

Figure 1 is a side elevation of our invention; Fig. 2, a top plan view of the same; and Figs. 3 and 4 are respectively longitudinal and transverse sections of the reel which guides the corn to the revolving knives.

A represents the running-gear of an ordinary farm-wagon, upon which is fitted a frame or platform, A'.

Secured to one side of the frame or platform A', by suitable braces, $a\ a$, is the frame B B of our corn-harvesting mechanism, the whole of which projects from and overhangs the side of the wagon, as fully shown in the drawings. The upper and lower longitudinal bars, B', of the harvester-frame are placed parallel with each other at an incline, with their higher ends toward the rear, and are provided with vertical rollers C C, around which runs an endless belt or carrier composed of a series of belts, C', provided with cross-slats $C^2$ at suitable intervals, each of which is furnished with a number of projecting teeth, $c$, having their outer ends bent in a reverse direction from the plane of motion, in order that they may catch and carry the stalks of corn up the inclined platform or way $C^3$, but will readily clear themselves at the upper end when the corn is thrown off upon the wagon. The pivotal shaft of the rear roller C extends downward through the platform $C^3$, and is furnished on its lower end with a pulley or belt wheel, $c'$, and a bevel-pinion, $c^2$, meshing with a similar gear, D, pivoted upon the main frame of the harvesting device and having a sprocket or chain wheel, D', driven by an endless chain, $d$, from a similar wheel, $D^2$, upon the hub of one of the wagon-wheels, as shown in Figs. 1 and 2. The shaft of the rear roller C also projects above the beam B', and carries a pulley, $e$, which is connected by an endless belt, E, with a similar pulley, $e'$, upon a shaft, $e^2$, journaled in a rear extension of the beam B', and this belt is also provided with spurs $e^3$, bent backward at their outer ends, and the lower end of the shaft $e^2$ is provided with a wheel provided with long spurs or arms, as represented at E' in Fig. 1, and this wheel, in connection with the belt E above it, carries the corn off the platform or way $C^3$ and delivers it upon the wagon, as will be readily understood. The shaft of the forward roller C also extends above the beam B', and is provided with a pulley, $b$, connected by an endless chain-carrier, G, with a similar pulley, $b'$, upon the end of a forward extension of the frame G', as shown in Figs. 1 and 2. This endless carrier G is of peculiar construction, being composed of long sections or links of metal $g$, connected by eyes $g'$, formed in each end, and each link having one end beyond its eye $g'$ bent outward to form a spur, $g^2$, and its opposite end bent upward to form a guide, $g^3$, these latter running in the space between the extension G' and the flanges $h$ of a cap, H, placed over the extension, and thus keep the chain always in proper position with its spurs $g^2$ pointing outward to catch and guide the corn to the cutters or knives.

Upon the forward lower end of the main frame B are pivoted two circular cutting-knives, I I, having their adjacent edges overlapping, and one of them being provided with a belt-pulley, $i$, which is connected with and receives rapid motion from the belt-wheel $c'$, by means of the belt $i'$ running over suitable intermediate guide-rollers, $i^2$, upon the frame B.

Secured to the frame B, outside the main carrier-belts C', is a guide-bar, K, having its forward end bent or flared outward, as seen at $k$, in order to gather in and guide to the cutters I any stalks which may be bent down or away from the line of motion of the machine. This guide-bar is secured to the frame B by means of a suitable number of pins or rods, $k'$, upon which, between the frame and guide-bar, are arranged spiral springs $k^2$, which keep the bar K always in close relation to the belt $C'$, but allow it to yield whenever necessary, to avoid breaking the stalks or injuring the ears of corn. The rear end of this bar is bent around, as shown at $K'$, to assist in delivering the corn to the wagon.

When it is desired to use this device in the field, if there is not sufficient room for the passage of the wagon between the outer row of corn and the fence, the outer row is first cut by hand and the machine is then started, the wagon running over the cut row and the cutting devices running even with the next one. The corn is gathered by the guide-chain G and flaring end of bar K and guided to the cutters I I, one of which is revolved rapidly by the belt $i'$ and the other by its friction with the first cutter and the corn being cut. The stalks, after being cut, are carried by the belt-carrier $C'$ up the inclined platform or way $C^3$, and are delivered at the rear end upon the wagon, where, when a sufficient quantity has been collected, they are bound by an attendant. The machine is of very simple and economical construction, may be attached to any farm-wagon, and forms an effective and rapidly-working corn-harvester. The braces $a\ a$ may of course be made adjustable, in order that the device may be lowered or raised to cut the corn at any height desired.

Having thus fully described our invention, what we claim as new, and desire to secure by Letters Patent, is—

1. In a corn-harvester, a carrier-belt composed of links, each of which is formed with an eye at each end, and having one end turned upward and the other outward, substantially as and for the purpose set forth.

2. In a corn-harvester, the combination of the chain spur-belt G, constructed as herein described, with the bar $G'$, pulleys $b\ b'$, and cap H, having flanges $h$, whereby the chain is held always in proper position with its carrying-spurs projecting horizontally, substantially as shown and described.

3. In a corn-harvester, the combination, with the wagon A and frame B, provided with an inclined way or platform, $C^3$, of the carrier $C'$, running over vertical rollers, the guide-belt G, delivery-belt E, spring-actuated guide-bar K, having its forward end flared outward and its rear end bent around toward the wagon, the revolving cutters I I, belt $i'$, pulleys $i\ c'$, gear-wheels $c^2$ D, sprocket-wheels $D'\ D^2$, and chain-belt $d$, all constructed and arranged to operate substantially as and for the purpose set forth.

In testimony whereof we affix our signatures in presence of two witnesses.

JOHN WAGNER.
HENRY DRYER.

Witnesses:
LEOPOLD HEINZE,
C. F. MOHR.